US008675831B2

(12) United States Patent
Cai et al.

(10) Patent No.: US 8,675,831 B2
(45) Date of Patent: Mar. 18, 2014

(54) STORAGE OF DATA MESSAGES FOR LATER RETRIEVAL BY THE RECIPIENT

(75) Inventors: Yigang Cai, Naperville, IL (US); Alok Sharma, Lisle, IL (US)

(73) Assignee: Alcatel Lucent, Paris (FR)

( * ) Notice: Subject to any disclaimer, the term of this patent is extended or adjusted under 35 U.S.C. 154(b) by 1476 days.

(21) Appl. No.: 11/552,430

(22) Filed: Oct. 24, 2006

(65) Prior Publication Data

US 2008/0095337 A1 Apr. 24, 2008

(51) Int. Cl.
*H04M 11/00* (2006.01)

(52) U.S. Cl.
USPC .......... 379/88.13; 379/88.12; 379/88.22; 455/412.1; 455/412.2; 709/201

(58) Field of Classification Search
USPC ............ 704/258, 260; 379/93.09, 52, 93.15, 379/100.09, 201.01, 205.01, 67.1–88.28; 455/433, 3.05–426.2, 456.1–466, 455/550.1–560, 575.1–575.9; 709/201–207, 217–248; 348/14.01–14.16; 370/259–271, 370/351–356
See application file for complete search history.

(56) References Cited

U.S. PATENT DOCUMENTS

| | | | | |
|---|---|---|---|---|
| 5,742,668 A * | 4/1998 | Pepe et al. | | 455/415 |
| 5,903,726 A * | 5/1999 | Donovan et al. | | 709/206 |
| 5,946,630 A * | 8/1999 | Willars et al. | | 455/466 |
| 6,108,559 A * | 8/2000 | Åstrom et al. | | 455/466 |
| 6,208,870 B1 * | 3/2001 | Lorello et al. | | 455/466 |
| 6,233,318 B1 * | 5/2001 | Picard et al. | | 379/88.17 |
| 6,463,292 B1 * | 10/2002 | Rahman | | 455/466 |
| 7,024,209 B1 * | 4/2006 | Gress et al. | | 455/466 |
| 7,123,695 B2 * | 10/2006 | Malik | | 379/88.13 |
| 7,224,774 B1 * | 5/2007 | Brown et al. | | 379/88.14 |
| 7,299,061 B2 * | 11/2007 | Kramarz-Von Kohout | | 455/466 |
| 7,333,822 B2 * | 2/2008 | Laumen et al. | | 455/466 |
| 7,373,384 B2 * | 5/2008 | Bragado Carrasco et al. | | 709/206 |
| 7,430,425 B2 * | 9/2008 | Knotts | | 455/466 |
| 7,774,006 B2 * | 8/2010 | Huggett et al. | | 455/466 |
| 2003/0110224 A1 * | 6/2003 | Cazier et al. | | 709/206 |
| 2003/0142364 A1 * | 7/2003 | Goldstone | | 358/402 |
| 2003/0229722 A1 * | 12/2003 | Beyda | | 709/310 |
| 2005/0064883 A1 * | 3/2005 | Heck et al. | | 455/466 |
| 2007/0083600 A1 * | 4/2007 | Bakos et al. | | 709/206 |
| 2007/0230668 A1 * | 10/2007 | Brown et al. | | 379/88.14 |
| 2008/0010350 A1 * | 1/2008 | Chen et al. | | 709/206 |
| 2008/0062253 A1 * | 3/2008 | Jaspersohn et al. | | 348/14.11 |
| 2008/0287106 A1 * | 11/2008 | Baldwin et al. | | 455/412.2 |

(Continued)

FOREIGN PATENT DOCUMENTS

CN 1812603 A1 8/2006
WO WO0176280 A2 10/2001

(Continued)

*Primary Examiner* — Hemant Patel
(74) *Attorney, Agent, or Firm* — Duft, Bornsen & Fettig, LLP (57) ABSTRACT

Systems and methods are disclosed that allow for storing of data messages (e.g., text messages or multimedia messages) in a data message mailbox. If a data message is sent from a sender to a recipient, then the communication network receiving the data message attempts to deliver the data message to the recipient. If unsuccessful in delivering the data message, then the network stores the data message for the recipient. If the communication network later receives a request to retrieve the stored data message from the recipient, then the communication network delivers the stored data message to the recipient.

15 Claims, 6 Drawing Sheets

(56) References Cited

U.S. PATENT DOCUMENTS

| | | | |
|---|---|---|---|
| 2008/0293389 A1* | 11/2008 | Chin et al. | 455/414.1 |
| 2009/0082044 A1* | 3/2009 | Okuyama et al. | 455/466 |
| 2009/0092234 A1* | 4/2009 | St. Onge et al. | 379/88.13 |
| 2009/0176511 A1* | 7/2009 | Morrison | 455/456.3 |
| 2009/0186638 A1* | 7/2009 | Yim et al. | 455/466 |
| 2009/0275315 A1* | 11/2009 | Alston | 455/414.3 |
| 2010/0009701 A1* | 1/2010 | Cai et al. | 455/466 |
| 2010/0056109 A1* | 3/2010 | Wilson et al. | 455/412.1 |

FOREIGN PATENT DOCUMENTS

| | | |
|---|---|---|
| WO | WO03026138 | 3/2003 |
| WO | WO03026138 A | 3/2003 |
| WO | WO2006101428 A1 | 9/2006 |

* cited by examiner

STORAGE OF DATA MESSAGES FOR LATER RETRIEVAL BY THE RECIPIENT

BACKGROUND OF THE INVENTION

1. Field of the Invention

The invention is related to the field of communication networks and, in particular, to providing systems and methods that store a data message (e.g., a text message or a multimedia message) for later retrieval by the recipient. More particularly, in one embodiment, if the data message cannot be delivered to the recipient, then the data message is stored and can be later retrieved by the recipient.

2. Statement of the Problem

Voice mail service in communication networks allows a called party to receive a voice mail message from a calling party when the called party is unavailable to receive a call. The voice mail service is valuable to the called party as he/she may not always be available to answer a call from the calling party (e.g., busy on another call, away from the phone, etc). When the calling party leaves a voice mail message for the called party, the called party can later access the voice mail messages to listen to the message, edit the message, forward the message, etc.

In a wireless (mobile) network, a voice mail service may be implemented as follows. A calling party places a call to a called party through the wireless network. A Mobile Switching Center (MSC) serving the calling party receives the call and routes the call to an MSC serving the called party. Responsive to receiving the call, the MSC serving the called party provides call alerting in an attempt to connect the call to the called party. If the called party does not answer the call, then the MSC routes the call to a voice mail server in the wireless network (assuming the called party has subscribed to the voice mail service). The calling party may then leave a voice mail message for the called party in the voice mail server. The voice mail server and/or the MSC serving the called party then transmit an alert message to the called party indicating that a voice mail message is being stored in a voice mailbox account of the called party. The called party can later access the voice mailbox account to retrieve the voicemail message.

Wireless service providers also offer text messaging services, such as Short Messages Service (SMS), to their subscribers. SMS is a service available to digital mobile phones that allows for transmitting and receiving short text messages. Many service providers also offer multimedia messaging services, such as Multimedia Messaging Service (MMS), that allow for transmitting and receiving not only text but also various kinds of multimedia content, such as images, audio clips, video clips, etc.

To send an SMS message, a sending party first enters text into a mobile phone or other text-enabled device. The sending party then enters a phone number for the recipient of the SMS message, and sends the SMS message. An MSC serving the sending party receives the SMS message and forwards the SMS message to a Short Message Service Center (SMSC). The SMSC provides a store-and-forward mechanism where the SMSC temporarily stores the SMS message, and then forwards the message to the MSC serving the recipient of the SMS message. The MSC then attempts to forward the SMS message to the recipient. If the recipient is unavailable, then the MSC may queue the message and attempt a retry after a time period. Commonly, the MSC will attempt three retries and then discard the SMS message if none of the retries are successful. The SMSC will also discard the SMS message if the MSC is not successful in forwarding the SMS message to the recipient. Message delivery by the SMSC is "best efforts" delivery and unfortunately there presently is no guarantee that an SMS message will be delivered to the recipient. Similar problems exist for MMS messages and other data messages.

SUMMARY OF THE SOLUTION

The invention solves the above and other problems by providing systems and methods that store a data message (e.g., a text message or a multimedia message) if the data message cannot be delivered to the recipient. Instead of a data message being discarded if it cannot be delivered to the recipient, the systems and methods described herein store the data message, such as in a data message mailbox. The recipient is then alerted that a data message is being stored for the recipient, and the recipient can retrieve the data message at a later time. By storing an undeliverable data message for later retrieval by the recipient, the recipient will not miss data messages that may be important to business or personal life. Service providers also benefit in storing an undeliverable data message for later retrieval in that revenues are not lost for undelivered messages.

One embodiment of the invention comprises a method of operating a communication network to provide a data message mailbox service. One step of the method includes receiving a data message from a sender to a recipient. Another step of the method includes attempting to deliver the data message to the recipient. Another step includes storing the data message responsive to a failure to deliver the data message to the recipient. Another step includes receiving a request from the recipient to retrieve the stored data message. Another step includes delivering the stored data message to the recipient responsive to the request.

Another embodiment of the invention comprises another method of operating a communication network to provide a data message mailbox service. One step of the method includes receiving a data message from a sender to a recipient. Another step of the method includes processing a user profile for the recipient to determine where to route the data message. Another step includes storing the data message responsive to processing the user profile. Another step includes transmitting an alert message to the recipient indicating that the data message is being stored for the recipient. Another step includes receiving a request from the recipient to retrieve the stored data message. Another step includes delivering the stored data message to the recipient responsive to the request.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
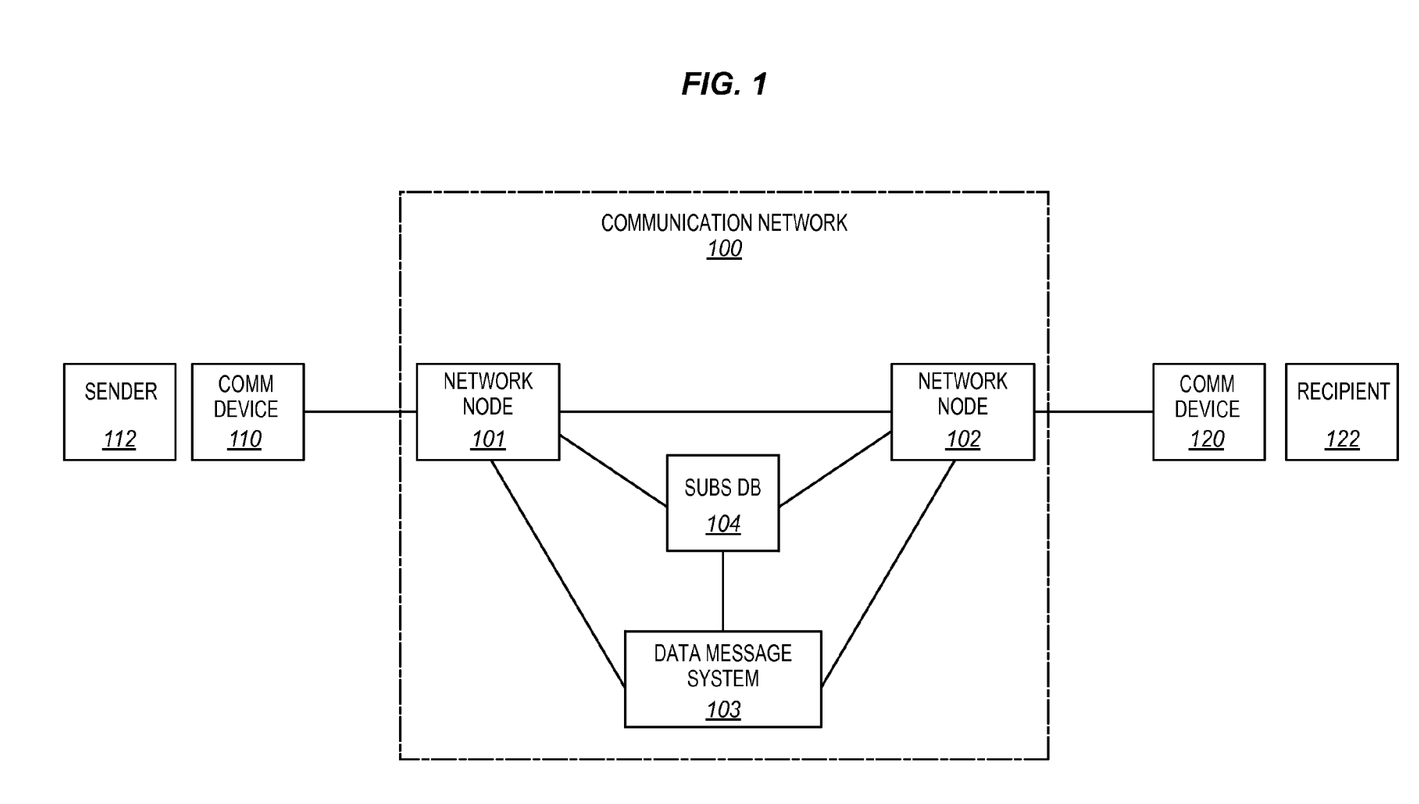
FIG. 1 illustrates a communication network in an exemplary embodiment of the invention.

FIG. 1 illustrates a communication network 100 in an exemplary embodiment of the invention. Communication network 100 may comprise a wireline network, a wireless network, or a combination of the two. Communication network 100 may include a circuit-based core network, a packet-based core network, such as an IP Multimedia Subsystem (IMS) network, and/or another type of core network. Communication network 100 in this embodiment includes network nodes 101-102, a data message system 103, and a subscriber database 104. Communication network 100 may include other networks, systems, or devices not shown in FIG. 1.

Communication network 100 is adapted to provide a data message mailbox service as will be described in more detail below. The data message mailbox service in this embodiment is illustrated by a sender 112 sending a data message to a recipient 122 that is unavailable. A data message comprises any type of telecommunications message transferred over a telecommunications network where the message includes data or information other than a voice message. Examples of a data message are text messages (e.g., SMS messages) and multimedia messages (e.g., MMS messages). Sender 112 operates a communication device 110 to send data messages to communication network 100. Recipient 122 operates a communication device 120 to potentially receive data messages from communication network 100. Communication devices 110 and 120 may each comprise a variety of communication devices, such as a wireline phone, a wireless (mobile) phone, a PDA, a VoIP phone, a SIP phone, or another type of phone enabled for data messages.

Network nodes 101-102 include any switches, servers, or other devices that serve communication devices. For instance, network nodes 101-102 may comprise switches in a wireline network, may comprise Mobile Switching Centers (MSC) in a wireless network, or may comprise Call Session Control Functions (CSCF) in an IMS network. In this embodiment, network node 101 serves the communication device 110 of sender 112, and network node 102 serves the communication device 120 of recipient 122. Those skilled in the art understand that communication devices 110 and 120 may be served by the same network node, but two network nodes 101-102 are shown merely for illustrative purposes.

Network nodes 101-102 may comprise instructions executable by a processing system to operate as described below to provide the data message mailbox service. Some examples of instructions are software, program code, and firmware. The instructions are operational when executed by the processing system to direct the processing system to operate in accordance with the invention. The term "processing system" refers to a single processing device or a group of inter-operational processing devices. Some examples of processors are computers, integrated circuits, and logic circuitry.

Data message system 103 comprises any device, server, or other system adapted to exchange data messages between communication devices 110 and 120. Data message system 103 may take on different forms depending on the type of data message being transmitted. For instance, if the data message comprises an SMS message, then data message system 103 may comprise a Short Message Service Center (SMSC). If the data message comprises an MMS message, then data message system 103 may comprise a Multimedia Messaging Service Center (MMSC). Data message system 103 may also be a stand-alone system accessible by an SMSC, an MMSC, or another data server.

Subscriber database 104 comprises any database or database system that stores user information or user profiles for users of communication network 100. For instance, a user profile may include information indicating where the user is located, information as to what services the user subscribes to, etc. Subscriber database 104 may comprise a Home Location Register (HLR) in a wireless network. Subscriber database 104 may also comprise a Home Subscriber Server (HSS) in an IMS network.

Assume for illustrative purposes that sender 112 wants to send a data message to recipient 122. To send the data message, sender 112 may use communication device 110 to create a data message and send the data message to communication network 100. Network node 101 receives the data message and forwards the data message to data message system 103.

Figure 2:
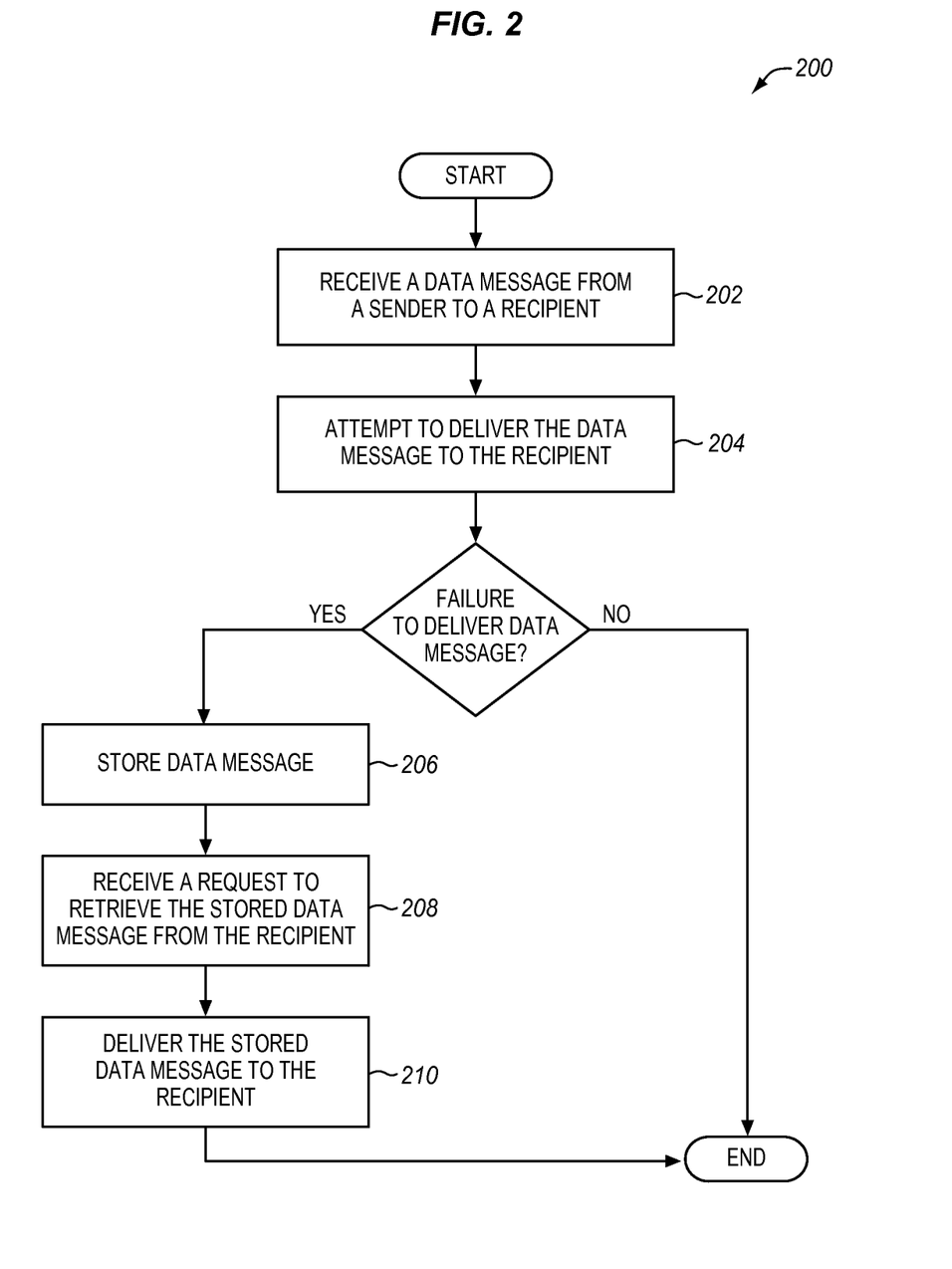
FIG. 2 is a flow chart illustrating a method of operating a communication network in an exemplary embodiment of the invention.

FIG. 2 is a flow chart illustrating a method 200 of operating communication network 100 in an exemplary embodiment of the invention. The steps of method 200 will be described with reference to communication network 100 in FIG. 1. The steps of the flow chart in FIG. 2 are not all inclusive and may include other steps not shown.

In step 202 of method 200, data message system 103 receives the data message from sender 112 to recipient 122. Data message system 103 then forwards the data message to network node 102 that is serving recipient 122. Data message system 103 may query subscriber database 104 to determine which network node 102 to route the data message.

In step 204, network node 102 attempts to deliver the data message to recipient 122. In attempting to deliver the data message, network node 102 may transmit an alerting signal to communication device 120 and wait for a response. If a response is received, then network node 102 may forward the data message to communication device 120. If a response is not received, then network node 102 may determine that recipient 122 (and his/her communication device 120) is unavailable to receive the data message. Network node 102 may also transmit another alerting signal after a time period to contact communication device 102 and deliver the data message. In response to a failure to deliver the data message to recipient 122, network node 102 transmits a delivery failure indication to data message system 103.

In step 206, data message system 103 stores the data message responsive to a failure to deliver the data message to recipient 122 as indicated by the delivery failure indication. Data message system 103 may include a storage mechanism or database where the data message is stored. Data message system 103 may alternatively store the data message on an external storage mechanism or database. Storage of the data message may resemble storage of voice mail messages in a voice mailbox. Consequently, data message system 103 may store the data message in a mailbox account for recipient 122. The mailbox account may be a combined voice mailbox and data message mailbox.

Storage of the data message may also be in an individual mailbox account or a group mailbox account (e.g., a family mailbox account). To determine where to store the data message, data message system 103 may process a user profile for recipient 122, and then store the data message in an individual mailbox account for recipient 122 or a group mailbox account for recipient 122 based on the user profile. For instance, a user profile of a child may define that data messages sent to the child are stored in a group mailbox account for the family. A user profile of a parent may define that some or all data messages sent to the parent are stored in an individual mailbox account for the parent.

When the data message is stored, data message system 103 may transmit an alert message to recipient 122 indicating that the data message is being stored for recipient 122. The alert message may take on many desired forms. For instance, data message system 103 may transmit the alert message in a signaling path to communication device 120 causing device 120 to display an icon indicating a new message. This type of alert message resembles present types of alerts used for voice mail messages. Data message system 103 may alternatively transmit an email message to recipient 122. The email message may indicate that a new data message has been received, and may even include content from the new data message. Through any of these alerts, recipient 122 knows that a new data message is being stored and that he/she needs to retrieve the stored data message.

In step 208, data message system 103 receives a request from recipient 122 to retrieve the stored data message. Responsive to the request, data message system 103 delivers the stored data message (and possibly other stored data messages) to recipient 122 through network node 102 in step 210. Recipient 122 may use many different methods for retrieving the data message. For instance, recipient 122 may place a call to the data message system 103 to retrieve the data message, much like recipient 122 may place a call to his/her voice mail server to retrieve voice messages. Recipient 122 may alternatively use web-based functionalities of his/her communication device 120, a PC, etc, to view a web page and retrieve the data message.

Data message system 103 provides advantages over a traditional SMSC/MMSC and operates quite differently. A traditional SMSC, for example, will temporarily store an SMS message before attempting to deliver the SMS message to the recipient. If the SMSC or the network node serving the recipient is unable to deliver the SMS message to the recipient (such as after three retries), then the SMS message is discarded. The SMSC and the network node perform a "push" operation to transmit the SMS message to the recipient. If the recipient is not available to receive the SMS message, then the SMS message is discarded and will never be delivered to the recipient.

Data message system 103, on the other hand, stores the data message if the push operation is unsuccessful. Storage of the data message in data message system 103 is not the "temporary" storage typically performed by a traditional SMSC. Once the data message is stored in data message system 103, recipient 122 performs an active "pull" operation to retrieve the data message from data message system 103. Data message system 103 stores the data message in a data message mailbox until recipient 122 actively retrieves the data message. Data messages are not discarded as with a traditional SMSC/MMSC, but are rather stored for later retrieval. Important data messages are advantageously not lost and data message delivery can be essentially guaranteed.

For the embodiment in FIG. 2, data message delivery is attempted before the data message is stored in the data message mailbox. In another embodiment, data message system 103 may be provisioned to store all or some of the received data messages instead of first attempting delivery. For instance, recipient 122 may request that all data messages be stored in his/her data message mailbox instead of being automatically delivered to his/her Communication device 120. Recipient 122 may also request that during a time period (e.g., during a meeting), data messages be stored in his/her data message mailbox instead of being delivered to his/her communication device 120.

Figure 3:
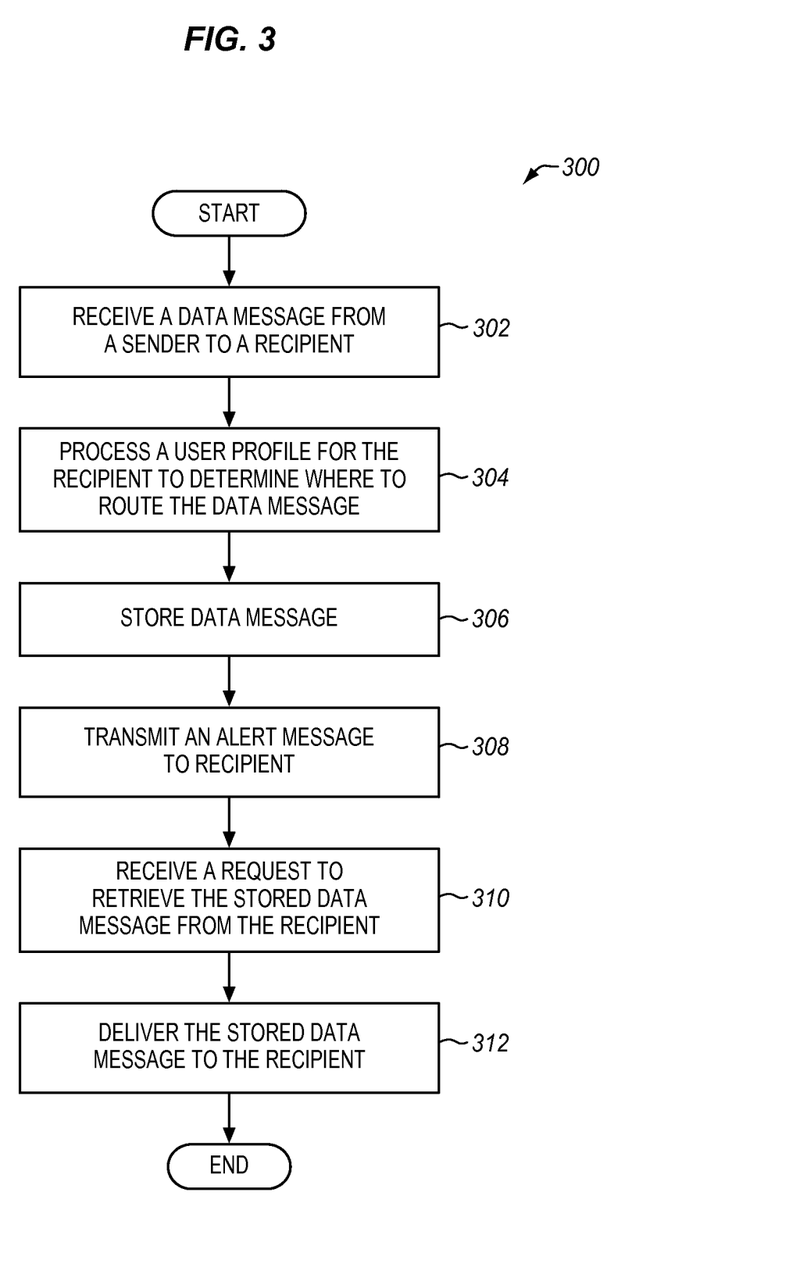
FIG. 3 is a flow chart illustrating another method of operating a communication network in an exemplary embodiment of the invention.

FIG. 3 is a flow chart illustrating another method 300 of operating communication network 100 in an exemplary embodiment of the invention. The steps of method 300 will be described with reference to communication network 100 in FIG. 1. The steps of the flow chart in FIG. 3 are not all inclusive and may include other steps not shown.

In step 302 of method 300, data message system 103 receives the data message from sender 112 to recipient 122. Data message system 103 then processes a user profile for recipient 122 to determine where to route the data message in step 304. The user profile may be stored in subscriber database 104. The assumption for this embodiment is that recipient 122 may want to store the data message in his/her data message mailbox. Thus, data message system 103 stores the data message responsive to processing the user profile in step 306. In step 308, data message system 103 transmits an alert message to recipient 122 indicating that the data message is being stored for recipient 122. In steps 310 and 312, data message system 103 receives a request from recipient 122 to retrieve the data message, and delivers the data message to recipient 122 responsive to the request.

Figure 4:
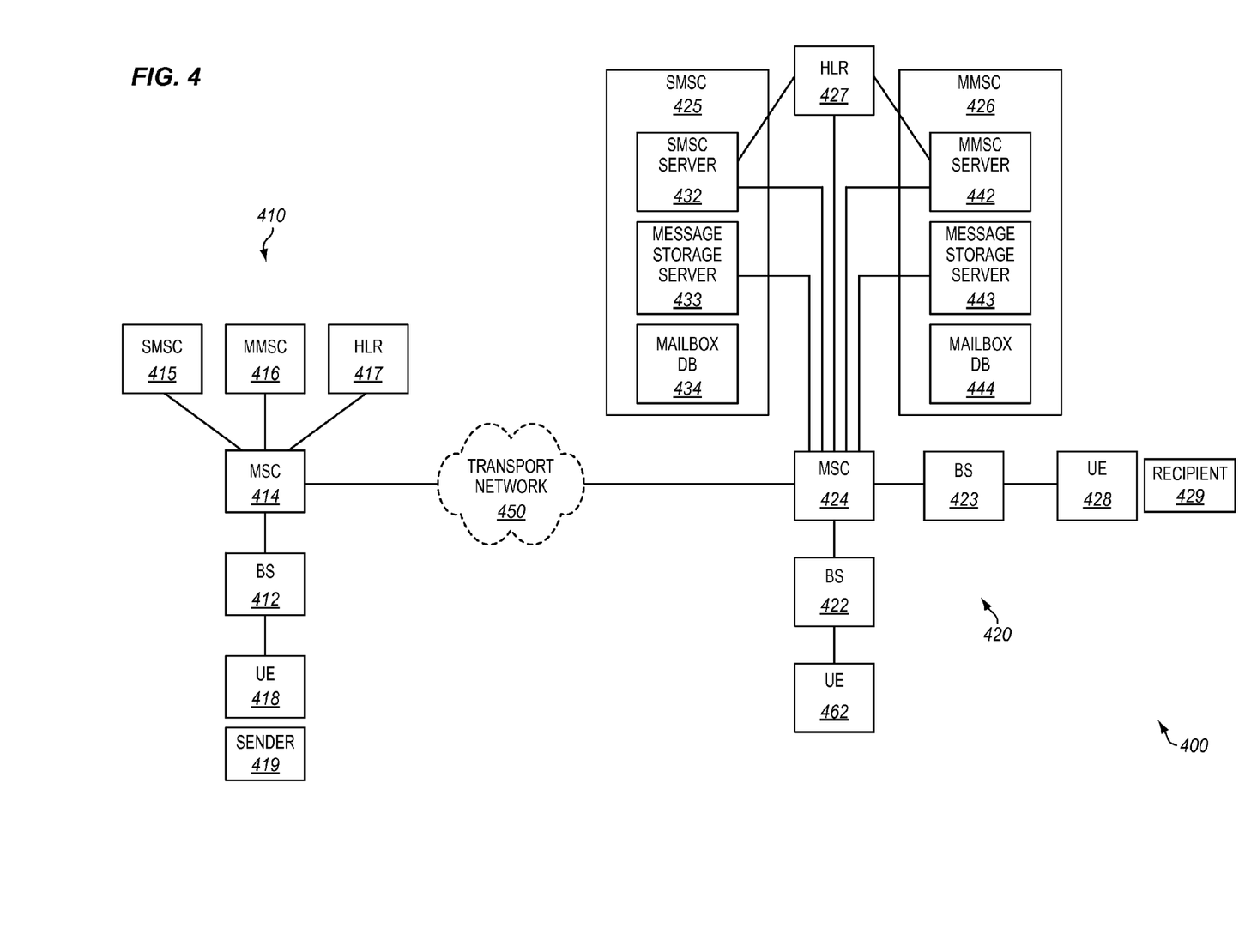
FIG. 4 illustrates another communication network in an exemplary embodiment of the invention.
Figure 5:
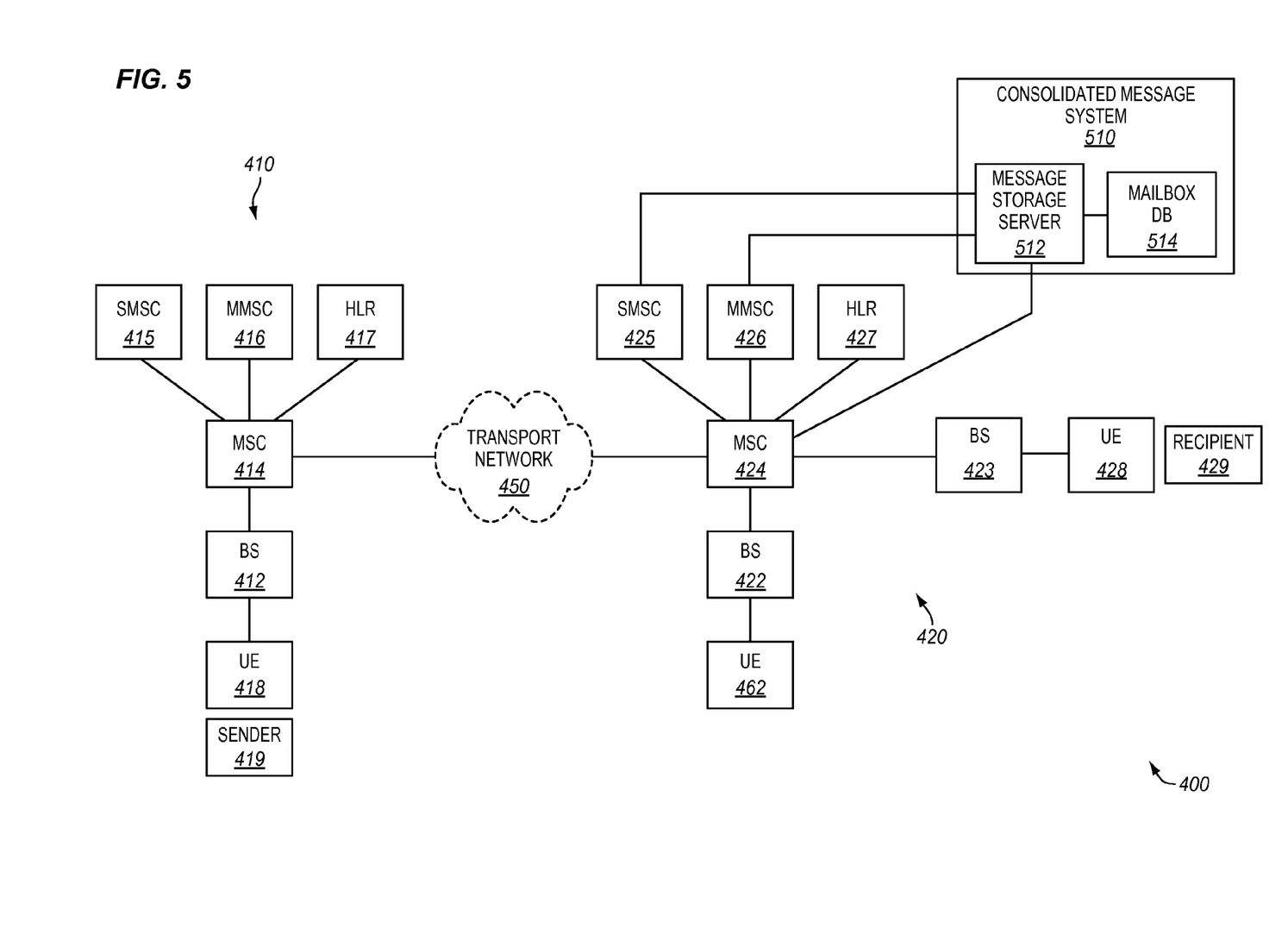
FIG. 5 illustrates another communication network in an exemplary embodiment of the invention.
Figure 6:
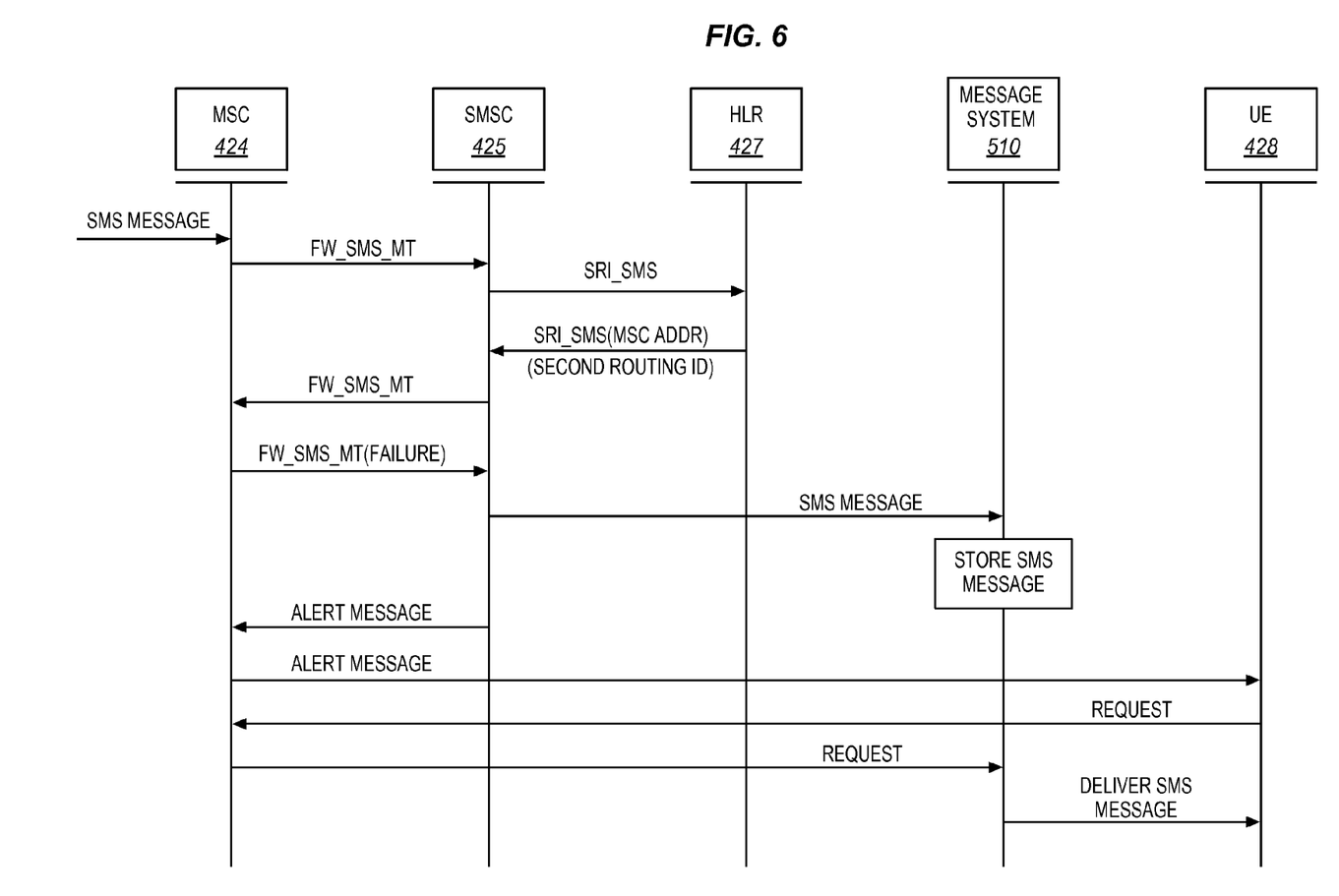
FIG. 6 is a message diagram illustrating an operation of a communication network to provide a data message mailbox service in an exemplary embodiment of the invention.

FIGS. 4-6 illustrate an example of implementing the data message mailbox service. FIG. 4 illustrates a communication network 400 in an exemplary embodiment of the invention. Communication network 400 includes a foreign network 410 and a home network 420 connected by a transport network 450. Foreign network 410 includes a base station (B.S.) 412, an MSC 414, an SMSC 415, an MMSC 416, and an HLR 417. Home network 420 includes base stations (B.S.) 422-423, an MSC 424, an SMSC 425, an MMSC 426, and an HLR 427. SMSC 425, in this embodiment, includes an SMSC server 432, a message storage server 433, and a mailbox database 434. Likewise, MMSC 426, in this embodiment, includes an MMSC server 442, a message storage server 443, and a mailbox database 444.

The data message system 103 of FIG. 1 has been incorporated into SMSC 425 and into MMSC 426 in FIG. 4. For instance, data message system 103 in FIG. 1 may be embodied as SMSC server 432, message storage server 433, and mailbox database 434 in FIG. 4. Likewise, data message system 103 in FIG. 1 may be embodied as MMSC server 442, message storage server 443, and mailbox database 444 in FIG. 4. Data message system 103 may alternatively be distributed in communication network 400. For instance, some operations of data message system 103 may be performed in SMSC 425 or MMSC 426, while other operations may be performed by a stand-alone consolidated system (which is illustrated in FIG. 5).

FIG. 5 illustrates a communication network 500 with a consolidated message system in an exemplary embodiment of the invention. FIG. 5 resembles FIG. 4 except that FIG. 5 includes a consolidated message system 510. Consolidated message system 510 includes a message storage server 512 and a mailbox database 514. Consolidated message system 510 serves both SMSC 425 and MMSC 426. Consolidated message system 510 may also be consolidated with a voicemail server or other systems for storing messages.

Communication network 400 in FIGS. 4-5 illustrates wireless networks using GSM standards. Those skilled in the art understand that communication network 400 may alternatively be another type of network, such as an IMS network. If communication network 400 is implemented as an IMS network, then the MSC's would be Call Session Control Functions (CSCF), the HLRs would be Home Subscriber Servers (HSS), etc.

In FIG. 5, assume that sender 419 wants to transmit an SMS message to recipient 429. To send the SMS message, sender 419 operates User Equipment (UE) 418 to transmit the SMS message to MSC 414 through base station 412. Responsive to receiving the SMS message, MSC 414 forwards the SMS message to SMSC 415. SMSC 415 queries HLR 417 to determine where recipient 429 is located. HLR 417 identifies the network location (i.e., MSCID of the MSC serving the recipient) of recipient and transmits a response to SMSC 415. The MSC 414 serving recipient 429 in this embodiment is MSC 424. SMSC 415 then forwards the SMS message to MSC 424 over transport network 450, such as through MSC 414.

FIG. 6 is a message diagram illustrating an operation of communication network 400 to provide a data message mailbox service in an exemplary embodiment of the invention. MSC 424 receives the SMS message over transport network 450. MSC 424 then forwards the message to SMSC 425 by transmitting a GSM MAP FW_SMS_MT message to SMSC 425. SMSC 425 then contacts HLR 427 using a GSM MAP Send Routing Information (SRI_SMS) request message to determine where to route the SMS message. HLR 427 processes a user profile for the recipient 429 to identify the MSC 424 that is serving the recipient 429. HLR 427 then transmits an SRI_SMS response message that includes a network address or network identifier of MSC 424 to SMSC 425. In present networks, HLR 427 transmits only the address of the serving MSC 424 to SMSC 425 in the SRI_SMS response message. According to an embodiment of the invention, HLR 427 also identifies a secondary routing identifier indicating where to store the SMS message if it cannot be delivered to recipient 429, and transmits the secondary routing identifier to SMSC 425. The secondary routing identifier may be for a consolidated (voice, SMSC, and MMSC) message system 510.

SMSC 425 then forwards the SMS message to MSC 424 by transmitting a FW_SMS_MT message to MSC 424. Responsive to receiving the FW_SMS_MT message, MSC 424 attempts to forward the SMS message to recipient 429 through base station 422 and UE 428.

If the delivery fails, then SMSC 425 will request a retry after a time interval. After one or more retry failures, MSC 424 indicates a failure of delivery to SMSC 425 by transmitting a FW_SMS_MT message indicating the failure. Responsive to the failure, SMSC 425 identifies the secondary routing identifier provided by HLR 427. The secondary routing identifier allows SMSC 425 to deliver the SMS message to consolidated message system 510 after one or more retries failed. SMSC 425 then forwards the SMS message to message storage server 512 based on the secondary routing identifier. Message storage server 512 stores the SMS message in mailbox database 514 in a mailbox for recipient 429.

To store the message, message storage server 512 first identifies a mailbox account for recipient 429 in mailbox database 514 based on a subscriber ID for recipient 429 (e.g., phone number, IP address, domain name, etc). Message storage server 512 then stores the undelivered SMS message to the identified mailbox of recipient 429. Message storage server 512 may also support a family plan where all undelivered messages for family members may be stored in one mailbox under a primary account ID.

Message storage server 512 also transmits an alert message to recipient 429 indicating that a new SMS message has been stored in the mailbox of recipient 429. Once recipient 429 is notified, recipient 429 can then retrieve the SMS message from message storage server 512. To retrieve the SMS message, recipient 429 can dial a 1-800 number or other specific service access code to access his/her mailbox account to retrieve the SMS message. Recipient 429 may alternatively press a button or click an icon on UE 428 to access the mailbox account. Message storage server 512 may also request a pass code to access the account, such as a password, a finger print, voice, eye or face recognition, etc.

The SMS message stored in mailbox database 514 may include a message index, such as sender name, number/address, sending time, storing time, retrieving time, retrieving status, message size, or media type. Recipient 429 can browse the stored SMS messages and view the message index. Recipient 429 can then select to listen, view, search, edit, delete, or forward the SMS message. Recipient 429 and/or the service provider may also provision the length of storage, the media type, priority, or allowed retrieve times of SMS messages that are stored by message storage server 512.

Although specific embodiments were described herein, the scope of the invention is not limited to those specific embodiments. The scope of the invention is defined by the following claims and any equivalents thereof.

We claim:

1. A method comprising:
   receiving a Short Message Service (SMS) message in a SMS Center (SMSC) of a communication network, wherein the SMS message is addressed to a recipient from a sender;
   attempting to deliver the SMS message from the SMSC to a communication device of the recipient;
   in response to delivery of the SMS message failing to the communication device, storing the SMS message in a mailbox for the recipient;
   receiving a request in the SMSC from the recipient to retrieve the stored SMS message; and
   delivering the stored SMS message to the recipient responsive to the request.

2. The method of claim 1 further comprising:
   receiving a Multimedia Message Service (MMS) message in a MMS Center (MMSC) of the communication network, wherein the MMS message is addressed to the recipient from the sender;
   attempting to deliver the MMS message from the MMSC to the communication device of the recipient;
   in response to delivery of the MMS message failing to the communication device, storing the MMS message in the mailbox of the recipient;
   receiving another request in the MMSC from the recipient to retrieve the stored MMS message; and
   delivering the stored MMS message to the recipient responsive to the other request.

3. The method of claim 1 further comprising:
   transmitting an alert message to the recipient indicating that the SMS message is being stored for the recipient.

4. The method of claim 3 wherein the alert message comprises an email message.

5. The method of claim 1 wherein storing the SMS message comprises storing the SMS message in an individual mailbox for the recipient.

6. The method of claim 1 wherein the mailbox is a combined voice mailbox and SMS message mailbox.

7. The method of claim 1 wherein storing the SMS message comprises:
processing a user profile for the recipient; and
storing the SMS message in an individual mailbox for the recipient or a group mailbox for the recipient based on the user profile.

8. A communication network, comprising:
a Short Message Service Center (SMSC) in the communication network adapted to receive a Short Message Service (SMS) message from a sender to a recipient, and attempt to deliver the SMS message to a communication device of the recipient;
the SMSC further adapted to store the SMS message in a mailbox for the recipient responsive to delivery of the SMS message failing to the communication device; and
the SMSC further adapted to receive a request from the recipient to retrieve the stored SMS message, and to deliver the stored SMS message to the recipient responsive to the request.

9. The communication network of claim 8 further comprising:
a Multimedia Message Service Center (MMSC) in the communication network adapted to receive a Multimedia Message Service (MMS) message from the sender to the recipient, and attempt to deliver the MMS message to the communication device of the recipient;
the MMSC is further adapted to store the MMS message in the mailbox of the recipient responsive to delivery of the MMS message failing to the communication device; and
the MMSC further adapted to receive another request from the recipient to retrieve the stored MMS message, and to deliver the stored MMS message to the recipient responsive to the other request.

10. The communication network of claim 8 wherein:
the SMSC is further adapted to transmit an alert message to the recipient indicating that the SMS message is being stored for the recipient.

11. The communication network of claim 10 wherein the alert message comprises an email message.

12. The communication network of claim 8 wherein the SMSC is further adapted to:
store the SMS message in an individual mailbox for the recipient.

13. The communication network of claim 8 wherein the mailbox is a combined voice mailbox and SMS message mailbox.

14. The communication network of claim 8 wherein the SMSC is further adapted to:
process a user profile for the recipient; and
store the SMS message in an individual mailbox for the recipient or a group mailbox for the recipient based on the user profile.

15. The communication network of claim 8 wherein the SMSC is further adapted to process a user profile for the recipient to determine where to route the SMS message, and to store the SMS message responsive to processing the user profile.

\* \* \* \* \*